(No Model.) 7 Sheets—Sheet 3.

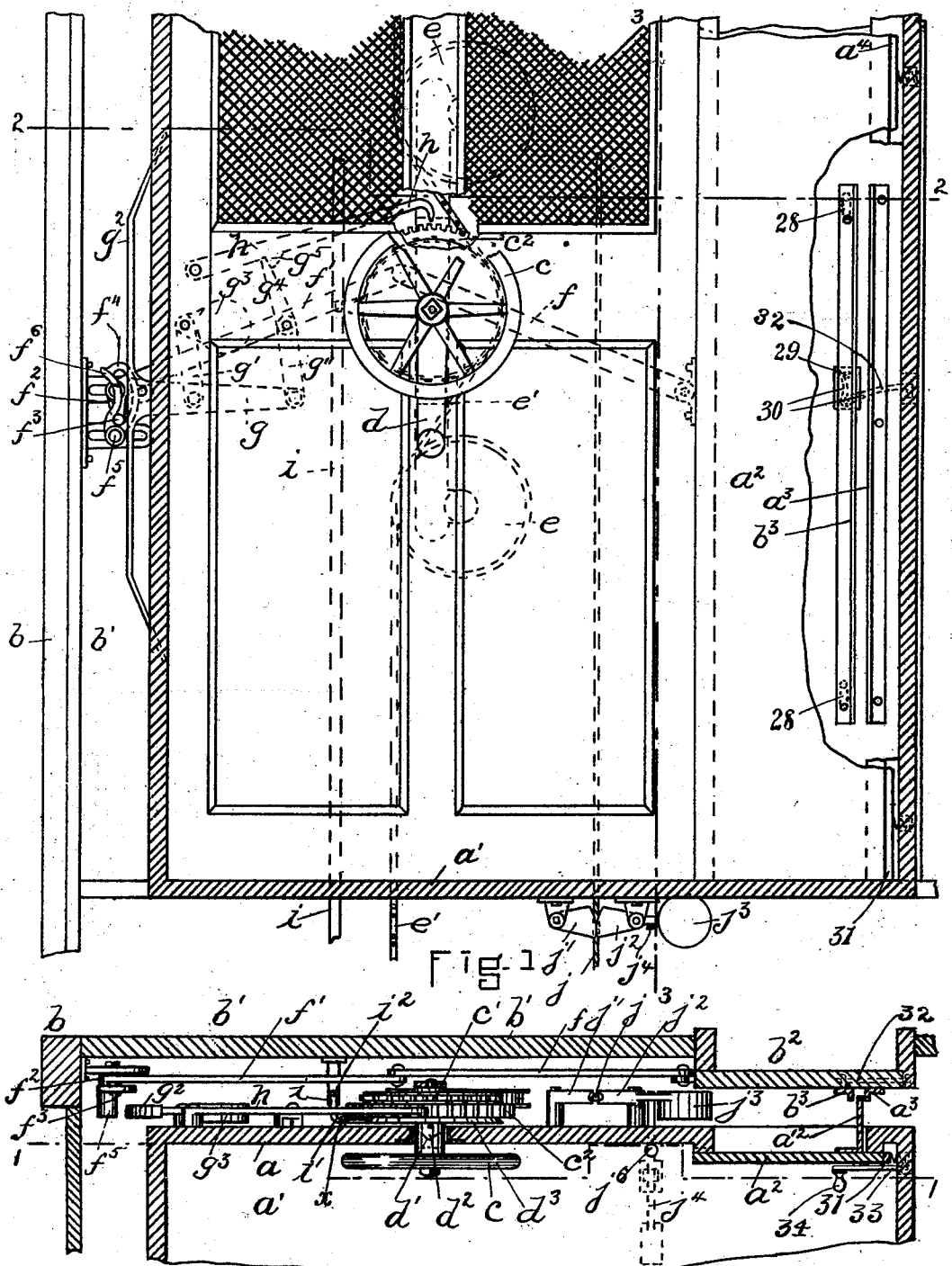

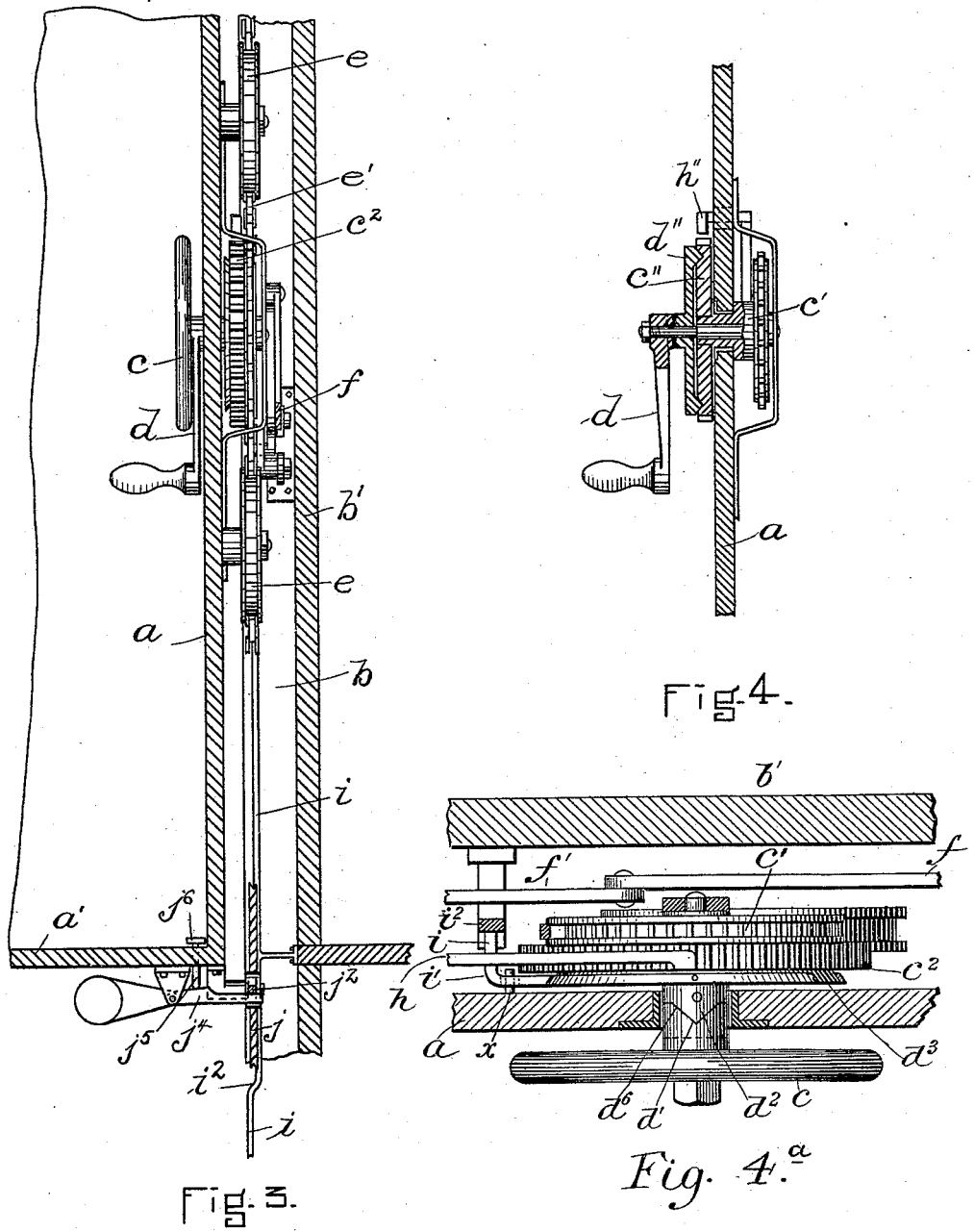

C. A. HARKNESS.
ELEVATOR.

No. 553,157. Patented Jan. 14, 1896.

WITNESSES.
Matthew M. Blunt
C. C. Steeher

INVENTOR.
C. A. Harkness
by A. W. Crossley
his ATT'Y

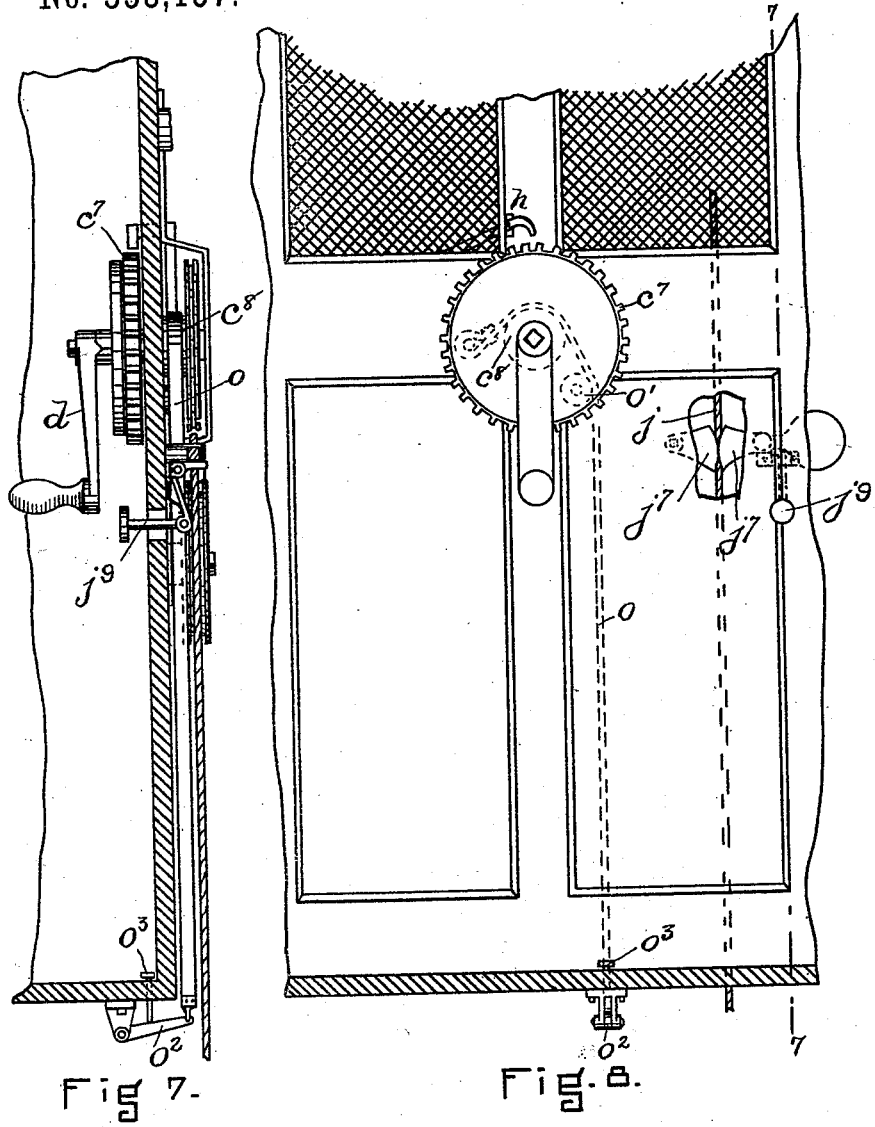

(No Model.) 7 Sheets—Sheet 5.
C. A. HARKNESS.
ELEVATOR.
No. 553,157. Patented Jan. 14, 1896.
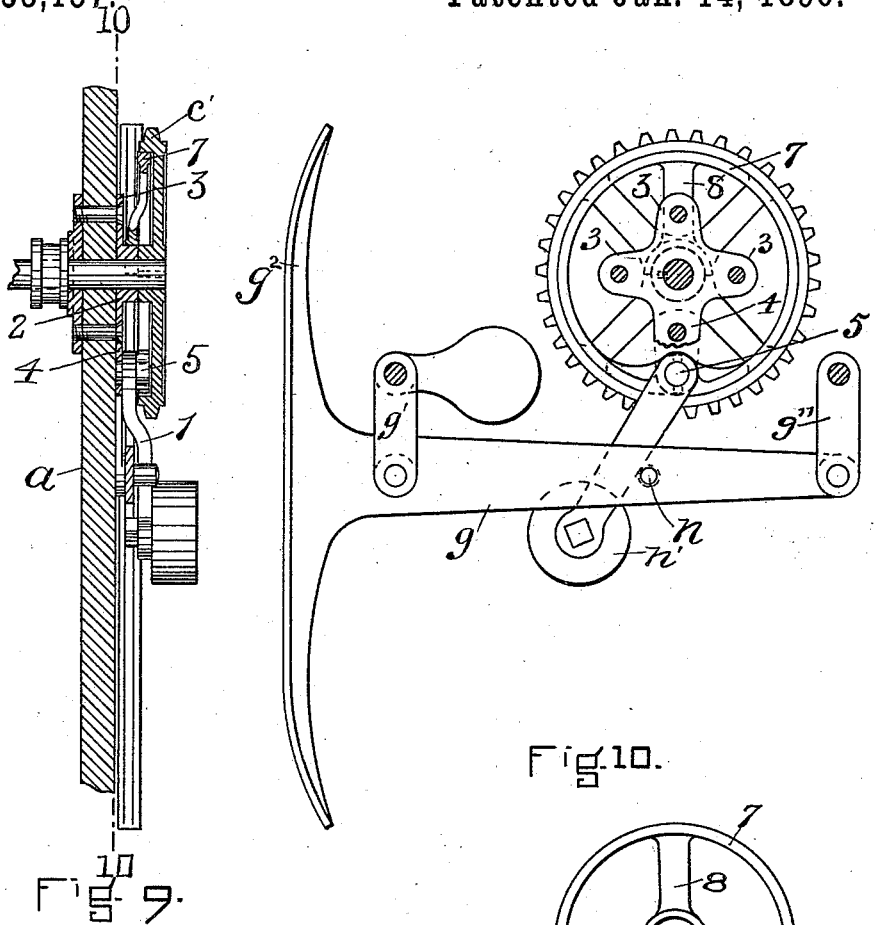
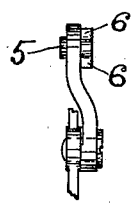
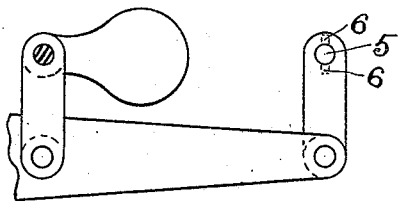
WITNESSES.
Matthew M. Blunt.
C. C. Steeler
INVENTOR.
C. A. Harkness
by A. W. Crossley
his ATT'Y.

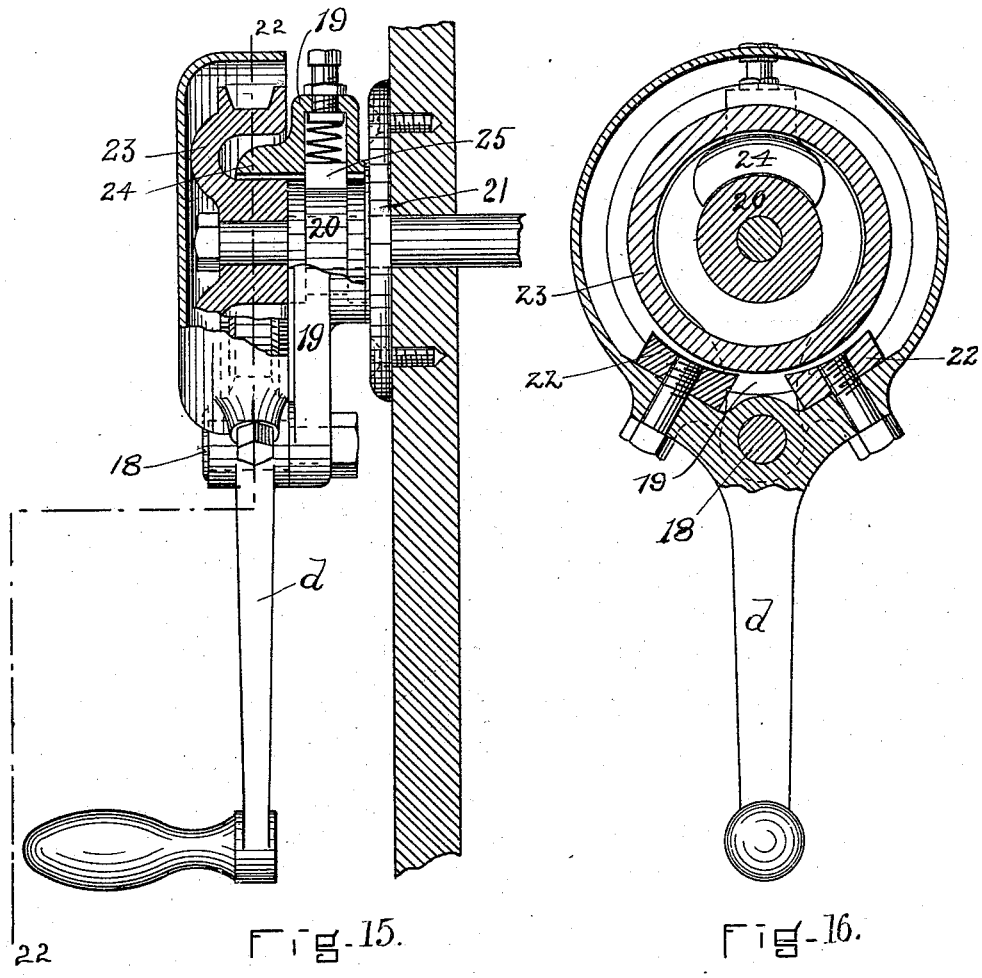

UNITED STATES PATENT OFFICE.

CHARLES A. HARKNESS, OF PROVIDENCE, RHODE ISLAND.

ELEVATOR.

SPECIFICATION forming part of Letters Patent No. 553,157, dated January 14, 1896.

Application filed January 7, 1895. Serial No. 534,165. (No model.)

*To all whom it may concern:*

Be it known that I, CHARLES A. HARKNESS, of Providence, in the county of Providence and State of Rhode Island, have invented certain new and useful Improvements in Elevators, of which the following is a specification.

The present invention relates to means for controlling the operation of elevators, and the principal object is to establish such an interdependence between the motive power which moves the car and the means of access to the car that only under certain prescribed conditions can the car be started and stopped or access be had thereto.

Other objects are the provision of auxiliary means for accelerating the speed of the car, for effecting a gradual stoppage of the same, for obtaining a more direct connection between the devices in the car manipulated by the attendant and the valve of the motor, for opening and shutting both doors in unison, for directly connecting the line controlled from within the car with the main valve, and not through the medium of a pilot-valve, and for perfecting the construction and mode of operation of an elevator in various other parts.

In the accompanying drawings, which illustrate constructions embodying the invention, means are shown for accomplishing all of the above-recited objects.

Figure 5:
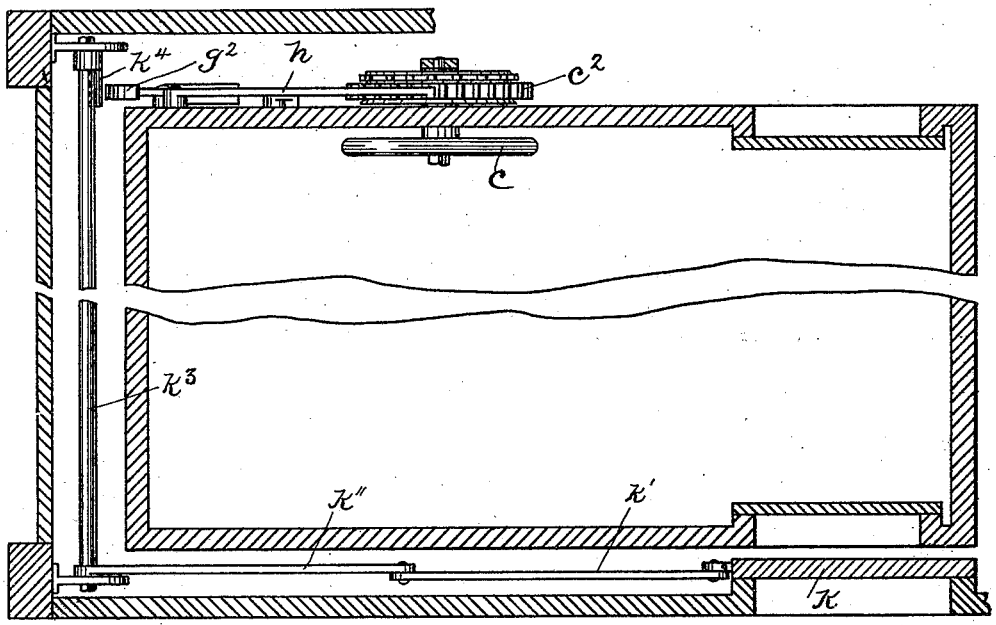
Figure 6:
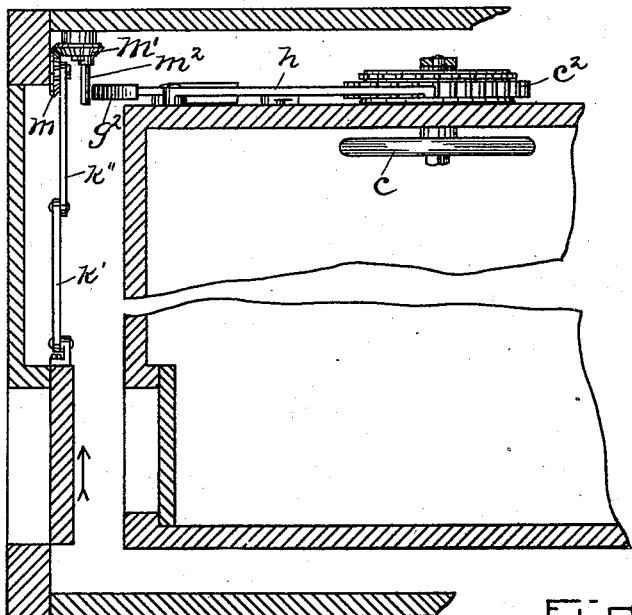
Figure 14:
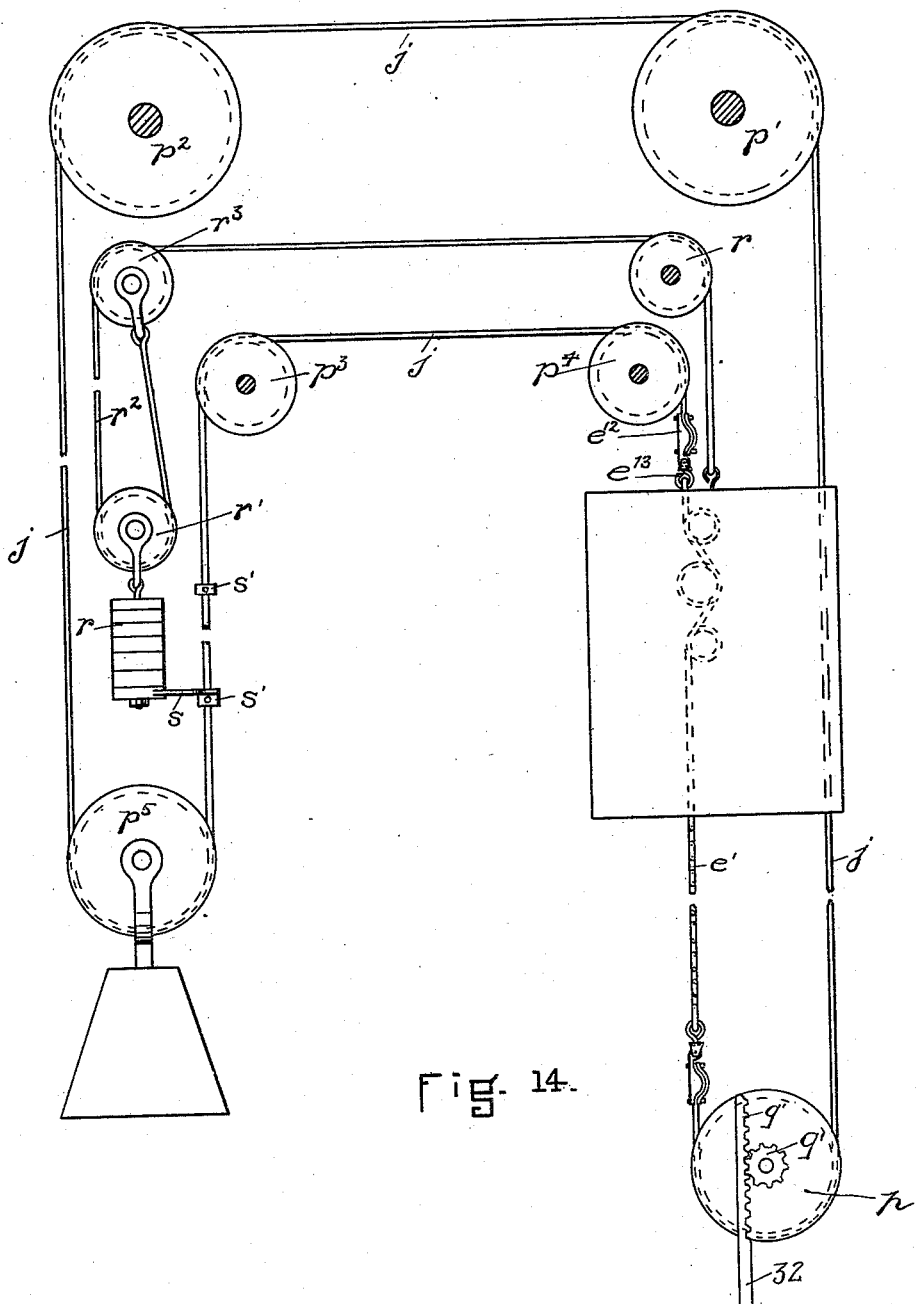

Of the drawings, Figure 1 shows a sectional view of a sufficient portion of a car and hatchway or well to display the controlling devices, the car being represented as at a landing with the car-door and the door of the hatchway both closed and the former broken away, and also a portion of the side of the car broken out. Fig. 2 shows a section on the line 2 2 of Fig. 1. Fig. 3 shows a section on the line 3 3 of Fig. 1. Fig. 4 shows a sectional view of a modified form of means for manipulation by the attendant. Fig. 4$^a$ is an enlarged view of parts shown in Fig. 2. Fig. 5 shows a horizontal section of the car and hatchway, illustrating a modified form of connection between the hatchway-door and the motor-controlling devices. Fig. 6 shows a similar view of another modification. Fig. 7 shows a view similar to Fig. 3, illustrating means for graduating the stoppage of the car. Fig. 8 shows an interior elevation of the same. Fig. 9 shows a sectional view similar to Figs. 3 and 7, illustrating a modification in the locking arrangement. Fig. 10 shows a section on line 10 10 of Fig. 9. Fig. 11 shows a detail of one member of the modified locking arrangement. Figs. 12 and 13 show further details of this modified locking arrangement, one being an edge view and the other a side view. Fig. 14 shows a diagrammatical view of a complete system. Figs. 15 and 16 show modified forms of clutching means hereinafter particularly described.

Referring first to Figs. 1, 2 and 3, the letter $a$ designates one side of the car; $a'$, the floor of the car; $a^2$, the sliding door of the car; $b$, a corner-post of the hatchway; $b'$, the front of the hatchway, and $b^2$ the door thereof. The doors $a^2$ and $b^2$ are operatively connected by interlocking ribs $a^3$ and $b^3$, so that the opening of the door $a^2$ opens the door $b^2$.

Through the side $a$ of the car there extends a shaft or spindle having affixed upon it inside the car a balance-wheel $c$, and outside the car a sprocket-wheel $c'$ and a toothed detent-wheel $c^2$. A handle $d$ is loosely mounted on said shaft within the car, the boss of said handle being formed with a V-shaped notch $d'$ for engagement with a similarly shaped projection $d^2$ on the hub of a clutch-cone $d^3$, entering a socket formed for it in the wheel $c^2$. It will be seen that by turning the handle in either direction the coaction of the inclined surfaces of the notch $d'$ and projection $d^2$ will cause the clutch-cone to be moved against the wheel $c^2$, and continued movement of said handle will turn said wheel and with it the wheel $c'$. A feather (not shown) on the shaft on which the cone moves forward insures the cone moving outward instead of turning. After the car has been started the handle will remain in the position to which it has been moved, and the clutch-cone will release itself and return to its original position relatively to the handle—that is, with the projection $d^2$ lying in the notch $d'$.

On the outside of the car there are two idlers $e$, one above and the other below the sprocket-wheel $c'$, and a sprocket-chain $e'$ is held in engagement with said wheel by the idlers. Said sprocket-chain is connected with the valve of the motor and the car runs along it as along the ordinary cable. It follows that the turning of the sprocket-wheel through the means within the car above described shifts the valve.

The engagement of the controlling line or chain $e'$ with the hand operative means, which in this instance consists of the hand operative device or lever $d$ and the wheel $c'$, is such that if the latter be locked against movement the line will be locked to the car to prevent creeping, as will be hereinafter explained. The wheel $c'$ may be also considered as a line operative means and be rotated in any suitable way, although I generally employ the devices hereinafter described.

The sprocket-wheel is locked when the car is at a landing and the doors are open through the following-described devices: A toggle composed of two members $f$ and $f'$ connects the door $b^2$ with the post $b$, the member $f'$ of said toggle having a lateral arm $f^2$ with a pin $f^3$ at its free end in engagement with a curved slotted arm $f^4$ pivoted at $f^5$ to a bearing in the post $b$.

There is a bar $g$ suspended on the outside of the car by equal-lengthed links $g'$ and $g''$, and said bar has an elongated cross-head $g^2$ presenting a face for the lug $f^6$ to act against when the car is at a landing. A weighted arm $g^3$ on the journal of the link $g'$ tends to project the bar outward toward the said lug. The other link $g''$ is extended, as at $g^4$, for engagement with the under edge of a long gravity-pawl $h$, which overhangs the wheel $c^2$ and is formed with a stop-lug $g^5$ for said link to encounter. When the hatchway-door is closed, the link is against the lug and the pawl is held up out of engagement with the wheel, as shown in Fig. 1. The movement of the toggle consequent upon the opening of the door causes the lug $f^6$ to be thrown against the cross-head $g^2$ by the coaction of the pin $f^3$ and the slotted arm $f^4$, and bar $g$ is swung inward, displacing the link $g''$ and allowing the pawl $h$ to drop into engagement with the wheel $c^2$ and lock the latter so long as the door is open. Therefore the car cannot move away until the door is closed.

From the foregoing it will be apparent that I have provided locking devices under the control of the door for positively locking and releasing the line-operating means, so that when the movable door is opened the car is prevented from creeping.

To prevent stopping the car, except at landings, a vertical strip $i$ is fastened along the inside of the hatchway, and the clutch-cone $d^3$ is equipped with an arm $i'$ bent outward to bear against said strip. At the landings said strip has offsets $i^2$, which permit movement of the clutch-cone, whereas at all other places the strip constitutes a stop to movement of said clutch-cone, and consequently to shifting of the motor-valve.

Auxiliary means for accelerating the speed of the car by a fuller movement of the valve than producible by manipulation of the handle $d$ are provided as follows: The return-rope $j$, which is continuous with the chain $e'$, extends along the outside of the car and between cam-shaped grippers $j'$ rigidly and immovably mounted on hangers and $j^2$ pivoted to hangers on the under side of the car-floor $a'$, said gripper $j^2$ being weighted on the outer side of its pivot, as shown at $j^3$, so as to have a tendency to grip the rope between it and the other gripper. A lever $j^4$, pivoted under the car and having a weight superior to the weight $j^3$, extends under the weighted arm of the gripper $j^2$ and normally holds the same free of the rope, and the said lever $j^4$ has resting upon it the lower end of a pin $j^5$, projecting through the floor of the car and formed with a foot-pressure knob $j^6$ on its upper end. By pressing with his foot on the said knob the attendant causes the grippers to grip the rope, and the latter to be then taken along with the car so that the valve is more fully opened and the speed of the car accelerated.

In the modification shown in Fig. 4, the detent-wheel $c''$ and clutch-disk $d''$ (slightly different in shape from that in Fig. 1) are inside the car, and no balance-wheel is used. In some instances the balance-wheel may be used in this connection, and it may in some instances be dispensed with in the construction shown in Figs. 1 and 2. The locking-pawl $h''$ is bent at right angles and passed through the side of the car for engagement with the detent-wheel.

In some instances the doors of the hatchway will be differently located at different landings. Where the hatchway-door at a landing is at the opposite side to that of the ground-floor, I employ the arrangement shown in Fig. 5. The letter $k$ designates the door at the landing and $k'$ and $k''$ members of a toggle connecting said door with a rock-shaft $k^3$, which extends across the side of the car and carries a pendent crank $k^4$, to act against the cross-head of the swinging bar. Where the door occurs in a side of the hatchway at right angles to the side of the elevator-supporting devices, I employ the arrangement shown in Fig. 6. Here the hatchway or corridor door is connected with toggle-levers $k'$ $k''$, like those before described, and said levers are likewise connected with the journal-stud of a bevel-gear $m$, which meshes with another bevel-gear $m'$ provided eccentrically with an inwardly-projecting pin $m^2$, which is so constructed and arranged as to be caused to act against the cross-head of the swinging bar when the gear $m'$ is turned, as it will be, by the sliding of the hatchway or corridor door through the medium of the toggle-levers.

Any other suitable equivalent connections between the door and means for controlling the pawl may be employed instead of those shown.

The purpose of locking the sprocket-wheel is for locking the operating-rope to the cars and thereby preventing the starting of the motor which is employed for raising or lowering the car, for by thus locking the rope to the car any movement of the motor causing the car to creep in one direction or the other will be immediately stopped or reversed by the pull of the car upon the line. Hence, this being one of the essential features of my invention, many changes may be made in the form in which it is embodied without departing from the spirit and scope thereof.

In Figs. 9 to 13, inclusive, the swinging bar $g$ has a pin $n$ against which a weighted gravity-lever 1 rests.

2 designates a plate secured to the side of the car and having three arms 3 3 3, by which it is fastened in place, and a longer arm 4, (part of which is shown in Fig. 10 by dotted lines as broken off,) through which the pivot or journal stud 5 connected with the gravity-lever 1 extends and in which it has a bearing. From the opposite end of the journal stud or pivot 5 there project radially in opposite directions pins or ribs 6.

7 designates a split clamping-ring arranged to fit within a circular chamber or recess formed in the side of the sprocket-wheel $c'$, it being understood that, in this case, the detent and wheel with which it co-operates are dispensed with. Depending from the upper part of the split clamping-ring 7 is a saddle-arm 8, having a rounded bearing formed on its lower end, so as to be suitably supported on a fixed rounded bearing on the car. The confronting ends of the split ring at its divided point are provided with recesses 9 9, rounded or formed on the arc of a circle, and between the said split ends and within the said recesses the portion of the stud 5 bearing the ribs or pins 6 projects. The said ends of the split ring do not quite meet and when the lever 1 is in normal position the ribs 6 project into the space between the said ends.

It being understood that the split clamping-ring is normally loose with respect to the sprocket-wheel, when the swinging bar $g$ is moved inward, the weighted lever $n'$ drops, the stud 5 will be turned, and its ribs or pins 6 acting on the ends 9 9 will expand the split ring in the chambered side of the sprocket-wheel and lock it against turning. The lever 1 and its journal-stud 5 are, of course, supported and maintained in position by the plate 2.

It will be understood that the weight on the lever 1 is inferior to that which impels the swinging bar outward, so that the parts will normally be held so that the split ring will be in unlocked or unclutched position with respect to the ratchet-wheel.

In Figs. 15 and 16 there is shown an alternative form of means for clamping the handle or lever to its shaft in order to move the latter and control the valve. In these last-mentioned figures the handle or lever $d$ is pivoted at 18 upon the lower end of a bracket 19 arranged upon the hub 20, which hub forms part of, or is connected with, the plate 21 affixed to the car. Connected with the handle at its base and on opposite sides of its pivotal point are two friction-shoes 22 22, one or the other of which is adapted to bear upon the wheel 23 in a groove formed on its periphery, which wheel is affixed to the sprocket-shaft. The bracket 19 at the point opposite to that at which the lever-handle is pivoted thereto is provided with a projection 24, which extends into grooves formed in the wheel 23.

It will be seen that when the handle $d$ is moved from the right to the left around the pivot 18 the projection 24 and one of the shoes 22 will grip or clamp the wheel 23, and then turn the shaft.

In the upper part of the bracket 19 there is a spring-pressed friction-shoe 25, which bears on the hub 20 with sufficient force to insure the swinging of the handle on the pivot 18 of the bracket when a movement is made to clutch the adjuncts of the handle with the shaft in either direction. The friction between the last-mentioned shoe and the hub 20 is not sufficient, however, to prevent the sliding of the same thereon after the handle and its adjuncts shall have been clamped to the shaft.

There is a screw shown above the spring of the spring-pressed shoe for adjusting the tension of the spring in order to regulate the frictional contact of said shoe with the hub.

In Figs. 1 and 2 there are shown contrivances whereby the door $a^2$ of the elevator car or lift may be connected with the corridor or hatchway door $b^2$, so that the two may be opened and closed in unison, and so that by moving the door $a^2$ to open it the door $b^2$ may first be unlatched and then also opened.

$a^3$ is a stationary strip attached in vertical position to the corridor-door $b^2$, and $b^3$ is a strip arranged when in normal position substantially parallel to the strip $a^3$, the strip $b^3$ being connected to the corridor-door by means of links 28 (shown in dotted lines) pivoted at one of their ends to the door and at the other end to said strip. At a proper point the strip $b^3$ is provided with an outwardly-projecting arm 29 adapted when the strip $b^3$ is moved laterally to act against the latch-handle 30 (see dotted lines in Fig. 1) and move the latch 32 to unlatch the door. The gravity of the said strip $b^3$ is sufficient to move it to normal position, as is shown in said Fig. 1.

The door $a^2$ is provided with a latch 33 with a handle 34, and is adapted to be closed against a spring-pressed strip, (see Fig. 2,) so that in closing the door $a^2$ it may be latched and moved still farther to fully close and latch the door $b^2$. The springs bearing against the strip 31 are limited in their outward movement, so that after the door $a^2$ is moved to latch the door $b^2$ the said springs will operate to move the door $a^2$ back to a predetermined position, which backward movement will bring the strip $a^{12}$, connected with the door $a$ and extending between the strips $a^3$ and $b^3$, to a point intermediate of said strips and so that it will not bear against either in the movement of the car up and down. Thus it will be seen that the two doors are provided with connections (strip $a^{12}$, strips $a^3$ and $b^3$, &c.) between them, whereby the opening and closing of the car-door $a^2$ will unlatch and open or close and latch the corridor-door.

Referring now to Fig. 14, it will be noted that the sprocket-chain $e'$ is connected at its ends to the rope $j$ so as to form with the said rope an endless line, running directly from the valve-wheel $p$ to and about sheaves or pulleys $p'$ $p^2$, the sheave $p^5$ of the tension device and sheaves $p^3$ $p^4$, back again to the valve-wheel. The tension device is provided with a weight and is movable vertically with the sheave $p^5$ in order to keep the line formed by the rope $j$ and chain $e$ taut at all times. The ends of the rope are connected with the ends of the sprocket-chain through intermediate devices, each consisting of a clamp $e^{12}$ clamped firmly upon a bight of the rope laid over a hump therein, and an eye $e^{13}$ swiveled in the end of the clamp, so that any twisting of the rope may not affect the position of the chain on the sprocket-wheel.

It is to be particularly noted that by my means, as represented in Fig. 14, the controlling means in the car connect directly with the main valve 32 of the motor through the medium of a main-valve-operating means, such as the valve-wheel $p$, and does not operate through the medium of a pilot-valve or other similar means, as is generally the case in elevators. The means herein shown for this direct connection with the main valve consist of a spur-gear $q$ on the valve-wheel or sheave $p$, which meshes with a rack $q'$ formed on the stem of the main valve.

The controlling-line is passed around the valve-wheel in such way that the latter may be positively rotated in either direction by the line, instead of positively rotating it in one direction by means of the line and relying upon a weight or equivalent devices to rotate it in the opposite direction. Nor do I limit myself to a valve-wheel, as any other of the devices now employed for operating the valve may be used instead. This direct connection with the main valve is an important feature of my invention, since it enables me to obtain a certain and an immediate responsive action of the valve to any movement of the handle or lever to operate the same.

It has heretofore been practically impossible to employ a relatively stationary line or standing rope connected directly with the main valve, in combination with a lever mounted at or near the floor of the car, owing to the fact that a considerable length of play of the main valve is required, which cannot be accomplished by means of a lever. It is necessary to move the line at least from a foot to six feet to shift the valve, and where a lever is employed in combination with a wheel concentric with the pivot or fulcrum thereof it is impossible to revolve the wheel for more than one-fourth of its revolution. Hence the line which passes over the wheel is moved but a few inches when the lever is moved from one limit to its other limit. Therefore it is necessary to employ some device by means of which the wheel may be revolved so that the standing rope or line may be moved a number of feet relatively to the car, and I have found that it can be done by means of a handle or hand-wheel adapted to be connected with the rope or line wheel, the hand-wheel or handle being capable of being rotated any desired number of times. Thus by connecting the standing rope or line with the valve-rod by means of the drum-pinion and rack passing around a wheel on the car and connecting a handle or hand-wheel with the rope-wheel or the axle thereof I can rotate the rope-wheel as many times as may be desired to move the line and therefore the valve to the proper extent.

The counterpoise or counterbalancing weight $r$ for the car or lift is suspended from a sheave $r'$ under which passes a rope $r^2$ connected at its nearest end to a suitable stationary object, the said rope passing from the sheave $r'$, over other sheaves $r^3$, and is connected at its other end to the top of the car or lift.

The counterbalancing-weight carries an arm $s$, which extends between tappets $s'$ on the rope $j$, so that when the car reaches the limit of its movement in either direction the motor-valve will be shifted so as to stop the car's movement in that direction.

When a car is run at high speed I provide means for graduating its stoppage, as shown in Figs. 7 and 8. The sprocket-wheel $c^7$ is formed with a hub $c^3$, and a strap $o$, fastened at one end to the car, passes over said hub and over a small idler $o'$ on the car, and thence depends for connection with a lever $o^2$, pivoted under the car-floor. Said lever has an upstanding arm $o^3$, which projects through the floor of the car and has a knob for the application of the attendant's foot. By pressure on this knob the attendant puts a brake on the wheel $c^7$ and it is gradually stopped in its rotation, which effects the closing of the motor-valve. This is of great advantage, as the car is thus stopped when the handle is disengaged from the wheel. When the car is traveling rapidly and the wheel is turning, the handle hangs normally motionless, and it is easier to stop the rotation of the wheel by means of the brake than it would be to clutch the handle thereto. When this brake mechanism is used under control of the attendant's foot, the speed-accelerating devices are somewhat modified, the grippers $j^7$ being applied by operating a pull or push rod $j^9$ which connects with a bell-crank lever extending under the weighted gripper.

It will be understood that the line $j$ may be composed as described or that a rod may be employed instead, running directly to the immediate means for controlling the main valve.

It is evident the invention is capable of embodiment in numerous ways, and hence I wish it understood that I do not limit myself to the forms of mechanism here shown.

I do not herein broadly claim a car-controlling device for elevators comprising a flexible line for controlling the motor, and a hand device on the car for operating the same, combined with a movable door and a device normally disconnected from the controlling-line, and coacting with said door for preventing the operation of said hand device when the door is moved toward open position and until it is closed, as that forms the subject-matter of a claim in my copending application, serially numbered 533,652, filed January 2, 1895.

I do not herein claim, broadly, an elevator-controlling apparatus comprising a controlling-line, a hand-operative device on the car connected therewith, a lock movably mounted on the car, lock-actuating mechanism, a door and means connected with said door to operate said lock-actuating mechanism so as to cause said hand-operative device to be locked when the door is partially or entirely open, as this is claimed in my copending application, Serial No. 566,051, filed October 18, 1895.

Having thus explained the nature of the invention and described a way of constructing and using the same, though without attempting to set forth all of the forms in which it may be made or all of the modes of its use, it is declared that what is claimed is—

1. In an elevator apparatus, the combination with a car adapted to travel up and down in the well or hatchway, a main valve operating means, a wheel on the car, and a hand operative device for freely revolving said wheel, of a line relatively to which the car travels and extending from the main valve operating means to and around a sheave in the well or hatchway, and from thence back to said main valve operating means, said line passing around the first said wheel on the car at points between the said sheave and said valve operating means, whereby when said hand operative device is revolved in either direction, the line and thereby the main valve operating means are positively shifted in one direction or the other.

2. In an elevator apparatus, the combination with the car of a line extending along the entire hatchway or well and connected with the main valve to operate the same, said car traveling relatively to the line, the part of said line extending throughout the travel of the car consisting of a sprocket chain, a sprocket-wheel engaging said section of chain, and means within the car to move said sprocket wheel and therefore the sprocket chain in one direction or the other.

3. In an elevator apparatus, the combination of the car and its sliding door, with the sliding door of the corridor or hatchway and its latch, and connections between the two doors to operate on the said latch, whereby the opening and closing of the car door will unlatch and open, and close and latch the corridor door.

4. Elevator controlling means comprising a valve shifting line, a wheel on the car for said line, a handle, a clutch between said wheel and said handle whereby said handle may be engaged and disengaged from said wheel, and a brake for said wheel, for engaging it to stop the car when the handle is disengaged therefrom.

5. Elevator controlling means, comprising a motor actuating line, line operating means on the car engaged with the line for shifting it in either direction, the engagement being such that if the line operating means be locked, the line will be locked to the car, and means for locking the said line operating means, whereby the line is locked to the car to prevent creeping of the same.

6. In an elevator apparatus, a car, and a tension device, in combination with an endless line running directly from the valve wheel over stationarily mounted pulleys at the top of the well or hatchway, thence down around said tension device, thence up over second stationarily mounted pulleys at the top of the well or hatchway and down to the said valve wheel, said line being provided at points between the tension device and said stationarily mounted pulleys with tappets, a counterbalancing weight provided with an arm to engage said tappets to stop the car at the limits of its movement and a rope connected to the car from which said counterbalancing weight is suspended.

7. Elevator controlling means comprising a valve shifting line, hand operative means on the car engaging the line to move it in either direction, the engagement being such that if the hand operative means be locked the line will be locked to the car, a movable door, and locking devices on the car controlled by said door for locking the hand operative means whereby the line is locked to the car as aforesaid.

8. Elevator controlling means comprising a valve shifting line, means on the car engaging the line for operating it, a door, and locking devices controlled by said door for positively locking and releasing the line operating means, whereby the line is locked to the car to prevent creeping of the same and unlocked therefrom, substantially as and for the purposes set forth.

9. Elevator controlling means comprising a valve shifting line, a wheel engaged therewith, a handle, means of connection between the latter and the wheel, a door, and locking means controlled thereby for positively locking and releasing the wheel.

10. Elevator controlling means comprising a valve shifting line extending along the outer side of the car, a wheel engaged with said line, a door, means controlled thereby for positively locking and releasing the said wheel, a handle on the interior of the car, and a clutch between the handle and the wheel.

11. Elevator controlling means comprising a valve shifting line extending along the outer side of the car, a wheel engaged with said line, a detent-wheel fast with said wheel, a locking pawl for engagement with said detent-wheel, a door, means connected with the said door for engaging said pawl with and disengaging it from the detent-wheel, a handle inside the car, and means of connection between said handle and the detent-wheel.

12. Elevator controlling means comprising a valve-shifting line outside the car, a wheel on the car engaged with said line, a locking device to hold said wheel stationary, a swing-bar operatively connected with said locking device and having an elongated abutment-face, a door and means actuated by the opening of the said door for moving said bar to operate the lock.

13. Elevator controlling means comprising a valve-shifting line outside the car, a wheel on the car engaged with said line, a locking device to hold said wheel stationary, a swing-bar operatively connected with said locking device and having an elongated abutment-face, an arm pivoted to the hatchway and having a lug to act against said abutment-face, a door, and a toggle connecting said arm and said door.

14. Elevator controlling means comprising a valve-shifting line outside the car, a wheel engaged with said line, a detent-wheel fast with said wheel, a gravity-pawl for engagement with the detent-wheel, a swing-bar, having an elongated abutment-face, links supporting said bar and one of them being extended for engagement with the gravity detent, an arm pivoted to the hatchway and having a lug to act against the abutment-face of said swing-bar, a door and means connecting said arm and the said door.

15. Elevator controlling means comprising a valve-shifting line outside the car, a wheel engaged therewith, a handle on the interior of the car, a clutch between the handle and the wheel, and means in the hatchway for preventing closing of the clutch except at landings.

16. Elevator controlling means comprising a valve-shifting line outside the car, a wheel engaged with said line, a handle inside the car, a clutch for connecting the handle and wheel, one of the clutch members and the handle having engaging surfaces for producing longitudinal movement of the clutch member by turning the handle, and the clutch member having a laterally projecting arm connected therewith; and a strip extending along the hatchway in front of said arm on the clutch to prevent movement of the latter, said strip being offset or interrupted at intervals for the purpose described.

17. In elevator controlling apparatus, a valve-shifting line outside the car, grippers on the car for engagement with said line, one of said grippers being weighted to produce a gripping action, and a superiorly weighted lever sustaining said weighted gripper and having an actuating piece projecting into the car.

18. The combination, with the car, and corridor doors of an elevator, of connections between the doors whereby they may be opened and closed in unison, yielding means connected with one of the doors, which will permit of it being closed and latched and moved still farther to close the other door, and then be moved back to a limited extent.

19. Elevator controlling means comprising a movable door, a car, a motor actuating line, and movable door actuated means on the car for locking the line thereto, whereby if the car creeps after the car is stopped and the door is opened, the motor will be actuated to counterbalance such creeping.

In testimony whereof I have signed my name to this specification, in the presence of two subscribing witnesses, this 20th day of November, A. D. 1894.

CHARLES A. HARKNESS.

Witnesses:
M. B. MAY,
C. C. STECHER.